US010344918B2

(12) United States Patent
Frenal

(10) Patent No.: US 10,344,918 B2
(45) Date of Patent: Jul. 9, 2019

(54) VALVE, RECEPTACLE AND METHOD FOR FILLING, EXTRACTING AND EVACUATING

(71) Applicant: L'Air Liquide, Société Anonyme pour l'Etude et l'Exploitation des Procédés Georges Claude, Paris (FR)

(72) Inventor: Antoine Frenal, Ezanville (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 116 days.

(21) Appl. No.: 15/555,322

(22) PCT Filed: Feb. 24, 2016

(86) PCT No.: PCT/FR2016/050426
§ 371 (c)(1),
(2) Date: Sep. 1, 2017

(87) PCT Pub. No.: WO2016/139404
PCT Pub. Date: Sep. 9, 2016

(65) Prior Publication Data
US 2018/0038551 A1 Feb. 8, 2018

(30) Foreign Application Priority Data
Mar. 4, 2015 (FR) .................................... 15 51811

(51) Int. Cl.
*F16K 1/30* (2006.01)
*F17C 13/04* (2006.01)
(Continued)

(52) U.S. Cl.
CPC .............. *F17C 13/04* (2013.01); *F16K 1/307* (2013.01); *F17C 1/00* (2013.01); *F17C 5/06* (2013.01);
(Continued)

(58) Field of Classification Search
CPC .... F17C 13/04; F17C 5/06; F17C 1/00; F17C 2205/0338; F17C 2227/044;
(Continued)

(56) References Cited

U.S. PATENT DOCUMENTS 3,930,517 A * 1/1976 Gagala .................... F17C 13/04
137/329.4
2012/0006445 A1 1/2012 Frenal et al.
(Continued)

FOREIGN PATENT DOCUMENTS

EP 2 591 274 5/2013
EP 2 699 837 2/2014
(Continued)

OTHER PUBLICATIONS

French Search Report and Written Opinion for corresponding FR 1551811, dated Jan. 28, 2016.
(Continued)

*Primary Examiner* — Jason K Niesz
(74) *Attorney, Agent, or Firm* — Elwood L. Haynes

(57) ABSTRACT

A valve delimiting an internal circuit extending between an upstream end and a downstream end, the valve including, arranged in series in the internal circuit; an isolation valve and a dust valve, the isolation valve being movable relative to a set between an upstream closed position of the circuit and at least one downstream open position of the circuit. The isolation valve being biased toward the upstream position by a return member, the dust valve having a downstream end and being arranged downstream of the isolation valve and being movable relative to the body between an upstream closed position of the upstream end of the circuit and at least one downstream open position of the upstream end of the circuit.

14 Claims, 4 Drawing Sheets

(51) Int. Cl.
*F17C 1/00* (2006.01)
*F17C 5/06* (2006.01)

(52) U.S. Cl.
CPC ............ *F17C 2205/0323* (2013.01); *F17C 2205/0326* (2013.01); *F17C 2205/0329* (2013.01); *F17C 2205/0332* (2013.01); *F17C 2205/0335* (2013.01); *F17C 2205/0338* (2013.01); *F17C 2205/0382* (2013.01); *F17C 2205/0385* (2013.01); *F17C 2223/0123* (2013.01); *F17C 2223/035* (2013.01); *F17C 2223/036* (2013.01); *F17C 2227/044* (2013.01); *F17C 2227/048* (2013.01)

(58) Field of Classification Search
CPC .......... F17C 223/035; F17C 2223/0123; F17C 2227/048; F17C 2205/0382; F17C 2223/036; F17C 2205/0335; F17C 2205/0329; F17C 2205/0326; F17C 2205/0323; F17C 2205/0385; F16K 1/307
See application file for complete search history.

(56) References Cited

U.S. PATENT DOCUMENTS

| | | |
|---|---|---|
| 2012/0160335 A1 | 6/2012 | Thyroff et al. |
| 2014/0048169 A1 | 2/2014 | Pisot et al. |
| 2015/0276132 A1 | 10/2015 | Roberge |

FOREIGN PATENT DOCUMENTS

| | | |
|---|---|---|
| FR | 2 955 170 | 7/2011 |
| FR | 2 958 006 | 9/2011 |
| FR | 2 962 519 | 1/2012 |
| FR | 2 996 278 | 4/2014 |
| GB | 1 152 890 | 5/1969 |

OTHER PUBLICATIONS

International Search Report for corresponding PCT/FR2016/050426, dated May 17, 2016.

* cited by examiner

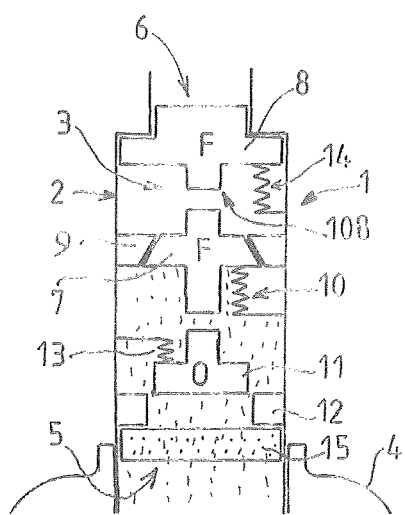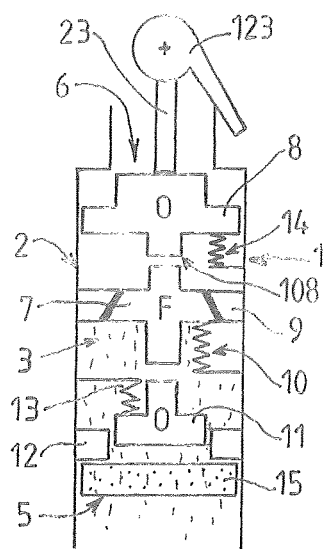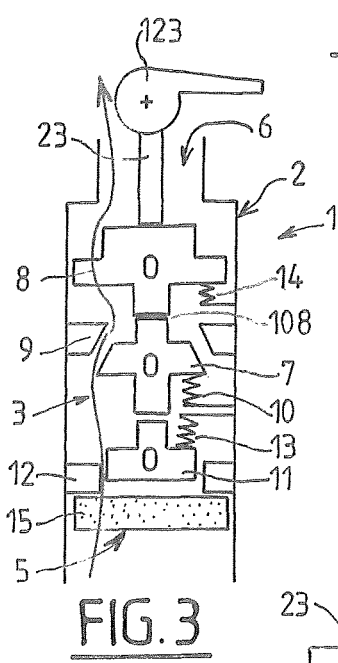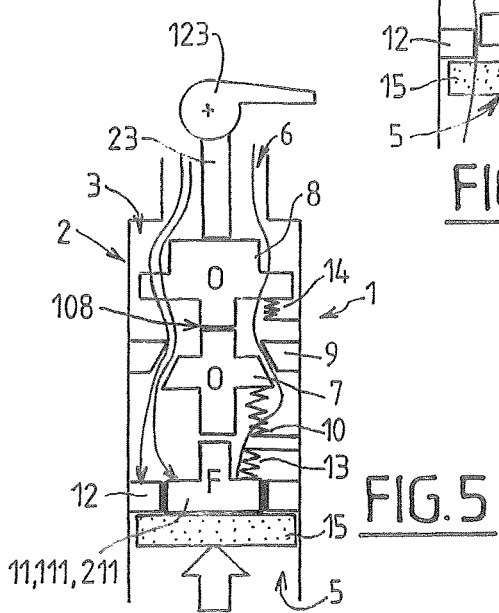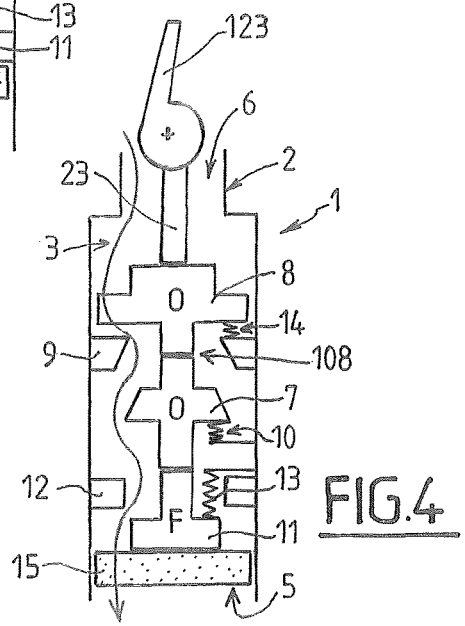

VALVE, RECEPTACLE AND METHOD FOR FILLING, EXTRACTING AND EVACUATING

CROSS REFERENCE TO RELATED APPLICATIONS

This application is a 371 of International PCT Application No. PCT/FR2016/050426, filed Feb. 24, 2016, which claims priority to French Patent Application No. 1551811, filed Mar. 4, 2015, the entire contents of which are incorporated herein by reference.

BACKGROUND

The present invention relates to a valve fitting, to a pressurized-fluid receptacle, and to corresponding methods for filling, extracting and evacuating.

SUMMARY

The invention relates more particularly to a valve fitting comprising a body delimiting an internal circuit for filling with and extracting fluid, said internal circuit extending between an upstream end intended to be connected to a user member extracting or distributing pressurized fluid via the internal circuit and a downstream end intended to be placed in communication with the storage volume of a pressurized-fluid reservoir, the valve fitting comprising, arranged in series in the internal circuit: an isolation valve and a dust valve, the isolation valve being able to move relative to a seat between an upstream position of closure of the circuit and at least one downstream position of opening of the circuit, said isolation valve being urged toward its upstream position by a return member, the dust valve comprising a downstream end and being arranged upstream of the isolation valve and able to move relative to the body between an upstream position of closure of the upstream end of the circuit and at least one downstream position of opening of the upstream end of the circuit, said dust valve being urged toward its upstream position by a return member.

The invention relates in particular to a valve fitting comprising a filling and extracting coupling comprising, in series, from upstream to downstream (in the direction of filling with gas), a dust valve and an isolation valve.

Document EP2699837A1 describes a pressurized-gas valve fitting comprising an isolation valve and a residual pressure valve which are arranged in series. The isolation valve may incorporate a nonreturn function. However, this structure is ill suited to fillings and extractions that are partially automated because actuation of the various valves has to be performed by hand, independently of the operations of coupling to the filling port.

Document EP2591274A1 describes a filling coupling comprising, arranged in series, a dust valve and an isolation valve incorporating a nonreturn function.

This type of filling valve is not perfectly well suited to the extraction of gas.

The known devices are therefore either suited to the filling of pressurized-gas reservoirs in order to prevent unauthorized filling, or suited to the extraction of pressurized gas to prevent external gas from being able to contaminate the interior volume of the reservoir.

The known devices are not able simultaneously to simplify and to automate the processes of filling and extraction from gas reservoirs using one and the same port or coupling while at the same time ensuring safety, reliability and ergonomics for the users.

It is an object of the present invention to alleviate all or some of the abovementioned disadvantages of the prior art.

To this end, the valve fitting according to the invention, which in other respects conforms to the generic definition thereof given in the above preamble, is essentially characterized in that the valve fitting further comprises, in the internal circuit, a residual pressure valve separate from the isolation valve, the residual pressure valve being arranged in series with the isolation valve and downstream of the isolation valve.

Note that the terms "upstream" and "downstream" refer to the two ends of the circuit (or of the coupling of the valve fitting or of the valve fitting itself) when the fluid is circulating in the direction of filling (from the outside toward the inside of the reservoir). What that means to say is that, during filling through the internal circuit, the fluid passes from the upstream end toward the downstream end. Of course, when the fluid is being extracted, it flows in this case from downstream toward upstream.

Furthermore, some embodiments of the invention may comprise one or more of the following features:
- the dust valve can be moved from its upstream position of closure toward: a first determined downstream position referred to as the "contactless position" opening the upstream end of the circuit, in which position the downstream end of the dust valve does not push on the isolation valve, or a second determined downstream position referred to as the "contacting position" opening the upstream end of the circuit, in which position the downstream end of the dust valve pushes on an upstream end of the mobile isolation valve in order through contact to move the isolation valve off its seat toward a first downstream position of opening of the circuit in which position the isolation valve does not push on the residual pressure valve, or a third determined downstream position referred to as the "filling position" opening the upstream end of the circuit, in which position the downstream end of the dust valve pushes on an upstream end of the mobile isolation valve in order through contact to move the isolation valve off its seat toward a second downstream position of opening of the circuit in which position the isolation valve pushes the residual pressure valve into a position of opening of the downstream end of the circuit,
- the isolation valve is movable from its upstream position of closure downstream into: a first determined downstream position of opening of the circuit, in which position the isolation valve does not push on the residual pressure valve, or a second determined downstream position of opening of the circuit in which position a downstream end of the isolation valve pushes an upstream end of the residual pressure valve moving the residual pressure valve into a position of opening of the downstream end of the circuit,
- the residual pressure valve comprises a nonreturn (NRV) mechanism generating a force on the residual pressure valve that urges it toward its position of closure of the circuit when the latter is not mechanically actuated and is subjected to a determined fluidic pressure on its upstream part,
- the nonreturn (NRV) mechanism comprises a canal connecting an upstream end of the residual pressure valve to a downstream chamber to convert a fluidic pressure on the upstream part of the residual pressure valve into a force on the downstream end of the residual pressure valve that tends to move said residual pressure valve into its position of closure of the circuit, the nonreturn (NRV) mechanism comprises a determined ratio of surface areas between, on the one hand, the upstream end of the residual pressure valve that is subjected to a fluid coming from upstream in the circuit and, on the other hand, the downstream end of the residual pressure valve, so as to urge said residual pressure valve into the position of closure when these downstream and upstream ends are subjected to a determined pressure differential, the valve fitting comprises a downstream filter arranged in the internal circuit and interposed downstream of the residual pressure valve and forcing at least some and preferably all of the flow of fluid passing through the circuit through the open residual pressure valve to pass through the filter, the residual pressure valve is configured to re-close the circuit as long as the pressure differential between its downstream and upstream ends does not exceed a determined value, for example comprised between 3 and 6 bar, namely, unless it is mechanically actuated toward its position of opening, the residual pressure valve opens the circuit only when the fluid pressure exerted on its downstream face exceeds the pressure exerted on its upstream face by a determined amount, the internal filling circuit extends along a longitudinal axis between the upstream and downstream ends, the dust valve, the isolation valve and the residual pressure valve are arranged in series in this order from upstream to downstream in the internal circuit, the dust valve is movable into at least the following four distinct positions: its upstream position of closure of the upstream end of the circuit, the first determined downstream position referred to as the "contactless position", the second determined downstream position referred to as the "contacting position", the third determined downstream position referred to as the "filling position", said four distinct positions of the dust valve (the upstream position of closure, the first determined downstream position referred to as the "contactless position", the second determined downstream position referred to as the "contacting position", the third determined downstream position referred to as the "filling position") are situated at distinct determined locations in the circuit that succeed one another in the upstream/downstream direction, the isolation valve is movable into at least the following three positions: its upstream position of closure, the first determined downstream position of opening of the circuit, the second determined downstream position of opening of the circuit, said three distinct positions of the isolation valve (the upstream position of closure, the first determined downstream position of opening of the circuit, the second determined downstream position of opening of the circuit are situated at distinct determined locations in the circuit that succeed one another in the upstream/downstream direction, when the residual pressure valve is not moved mechanically into a position of opening of the circuit (via the isolation valve), the nonreturn (NRV) mechanism prevents pressurized fluid from passing from upstream to downstream by keeping the residual pressure valve closed via the pressure of the fluid flowing from upstream to downstream on the residual pressure valve, the dust valve bears a filter interposed in the path of at least some of the fluid passing between the upstream and downstream ends of the circuit, the filter being able to move with the dust valve, the dust valve comprises one or more passages for guiding at least part of the flow of the fluid passing from upstream to downstream through the body of said dust valve, the passage or passages are situated upstream of the filter borne by the dust valve and open upstream of said filter, the body of the valve fitting has a portion of cylindrical overall shape the exterior surface of which comprises, from upstream to downstream, a cylindrical attachment zone comprising at least one groove and/or at least one peripheral rib and at least one of the following: a multi-faceted zone, notably a hexagonal zone, a threaded zone, in the upstream position of closure of the upstream end of the circuit, the dust valve closes the circuit in a fluidtight or non-fluidtight manner, the valve fitting comprises at least one seal borne by the dust valve and/or the valve fitting body in order to channel the gas flowing in the circuit via the open upstream end of the circuit, for example the periphery of the dust valve comprises a seal collaborating with the internal surface of the circuit, the internal circuit is used both for filling with and extraction of gas, which means to say that the circuit is two-directional, the fluid circulating from upstream to downstream (5) in the circuit via the valves in series in the case of filling, and circulates from downstream to upstream in the circuit via the valves in series in the case of extraction, at the end of the process of filling a receptacle with pressurized gas, the isolation valve is closed again automatically by its return member when the force exerted on the upstream part thereof drops below a determined threshold, the exterior surface of the body comprises indentations forming attachment recesses and/or reliefs which are intended to collaborate with mating shapes belonging to a conditioning outlet so as to form a selective mechanical attachment system, notably a quick-fit connection, the valve fitting comprises a duct having a first end connected to the circuit downstream of the residual pressure valve and a second end connected to at least one of the following: a pressure measurement member (for example a pressure gauge mounted on the body) to indicate the pressure in the reservoir, a safety valve comprising a pressure-sensitive shutter to evacuate gas to the outside of the valve fitting in the event of a determined excessive pressure.

The invention also relates to a pressurized-fluid receptacle, particularly a pressurized-gas cylinder or collection of cylinders, comprising a valve fitting in accordance with any one of the features above or below.

The invention also relates to a method of filling such a pressurized-fluid receptacle by means of a conditioning outlet connected mechanically to the body of the valve fitting removably, the method comprising a step of moving the dust valve from upstream to downstream into a determined downstream position referred to as the "filling position" opening the upstream end of the circuit, in which position the downstream end of the dust valve pushes on an upstream end of the mobile isolation valve and through contact moves the isolation valve off its seat into a downstream position of opening of the circuit, the residual pressure valve being also moved into a position of opening of the downstream end of the circuit so as to allow fluid to be transferred from upstream to downstream into the receptacle.

According to other possible specifics:

in its determined downstream position referred to as the "filling position", the downstream end of the dust valve pushes on an upstream end of the mobile isolation valve and through contact moves the isolation valve into a determined position of opening in which position the isolation valve in turn pushes the residual pressure valve into a position of opening of the downstream end of the circuit so as to allow the transfer of fluid from upstream to downstream into the receptacle, the dust valve is moved downstream by a mechanical action of one end of a mobile valve pusher belonging to the conditioning outlet.

The invention also relates to a method of extracting pressurized fluid from such a pressurized-fluid receptacle, by means of a conditioning outlet mechanically connected to the body of the valve fitting removably, the method comprising a first step of moving the dust valve from upstream to downstream into a determined downstream position referred to as the "contacting position" opening the upstream end of the circuit, in which position the downstream end of the dust valve pushes on an upstream end of the mobile isolation valve in order through contact to move the isolation valve off its seat toward a first downstream position of opening of the circuit in which position the isolation valve does not push on the residual pressure valve, so as to allow fluid to be extracted from the circuit from downstream to upstream through the residual pressure valve which has been opened by the downstream pressure in the receptacle.

The invention also relates to a method of evacuating the valve fitting of such a receptacle by means of a conditioning outlet connected mechanically and fluidtightly to the body of the valve fitting, the method involving a step of moving the dust valve from upstream to downstream into a determined downstream position referred to as the "contactless position" opening the upstream end of the circuit but in which the downstream end of the dust valve does not push on an upstream end of the mobile isolation valve which remains in the closure position, and a step of generating a subatmospheric pressure in the upstream part of the extraction circuit, namely upstream of the isolation valve.

The invention may also relate to any alternative device or method comprising any combination of the features above or below.

BRIEF DESCRIPTION OF THE DRAWINGS

Further specifics and advantages will become apparent from reading the following description which is given with reference to the figures in which:

FIG. 1 depicts a schematic and partial view in cross section illustrating the structure of a valve fitting mounted on a reservoir according to one exemplary embodiment of the invention in a closed configuration (three valves closed), FIG. 2 depicts the valve fitting of FIG. 1 equipped with an actuating member and in a first state (first valve open), FIG. 3 depicts the valve of FIG. 1 equipped with an actuating member and in a second state referred to as the extraction state (all three valves open), FIG. 4 depicts the valve fitting of FIG. 1 equipped with an actuating member and in a third state referred to as the "filling state" (all three valves open), FIG. 5 depicts the valve of FIG. 1 equipped with an actuating member and in a fourth state referred to as the "nonreturn state" (first two valves open and third valve closed)

DESCRIPTION OF PREFERRED EMBODIMENTS

Figure 6:
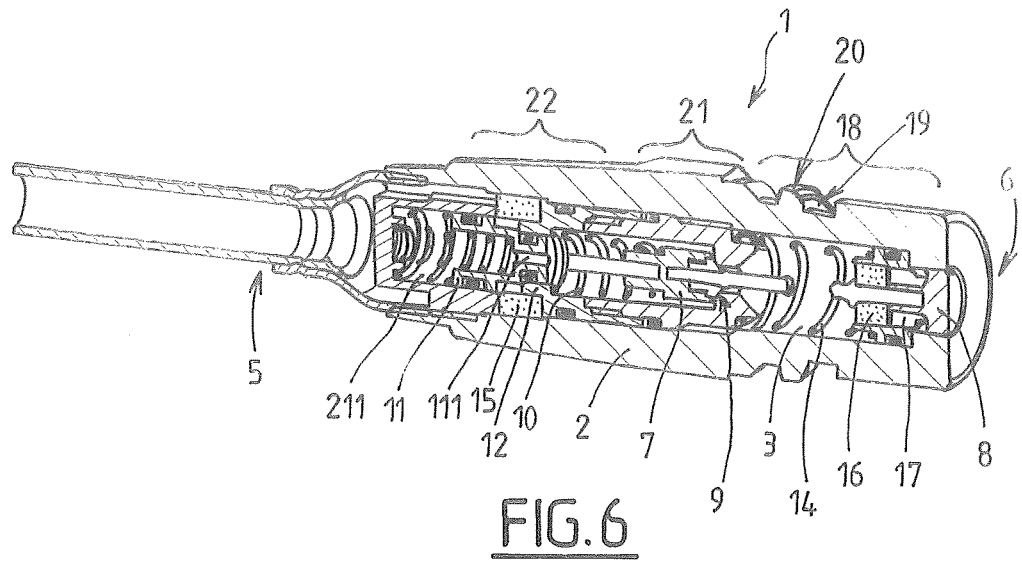
FIG. 6 depicts a schematic and partial view in longitudinal section of one structural exemplary embodiment of a valve fitting according to the invention in a closed configuration.

With reference to FIGS. 1 and 6, the valve fitting 1 comprises a body 2 delimiting an internal circuit 3 for filling with and extracting fluid.

The internal circuit 3 extends between an upstream end 6 intended to be connected to a user member extracting or distributing pressurized fluid via the internal circuit 3 and a downstream end 5 intended to be placed in communication with the storage volume of a pressurized-fluid reservoir 4.

For preference, the internal circuit 3 extends along a longitudinal axis. Likewise, the body 2 preferably extends along a longitudinal axis and has an oblong, for example cylindrical, overall shape.

The valve fitting 1 comprises, arranged in series in the internal circuit 3 from upstream 6 to downstream, a dust valve 8, an isolation valve 7 and a residual pressure valve 11.

Each valve preferably comprises a respective shutter capable of moving relative to a respective seat. In addition each mobile shutter is urged by a respective return member such as a spring toward a position of closure of the internal circuit 3.

Thus, the isolation valve 7 is able to move in translation relative to its seat 9 between an upstream position of closure of the circuit 3 and at least one downstream position of opening of the circuit 3. The isolation valve 7 is urged toward its upstream position by a return member 10 such as a spring.

The dust valve 8 comprises a downstream end 108 and is arranged upstream of the isolation valve 7. The dust valve 8 is able to move relative to the body 2 between an upstream position of closure of the upstream end of the circuit 3 and at least one downstream position of opening of the upstream end of the circuit 3. The dust valve 8 is urged toward its upstream position by a return member 14 such as a spring.

As depicted in FIGS. 1 and 6, in a rest situation (no external influence), the three valves 8, 7, 11 are in their position of closure of the circuit 3.

Figure 7:
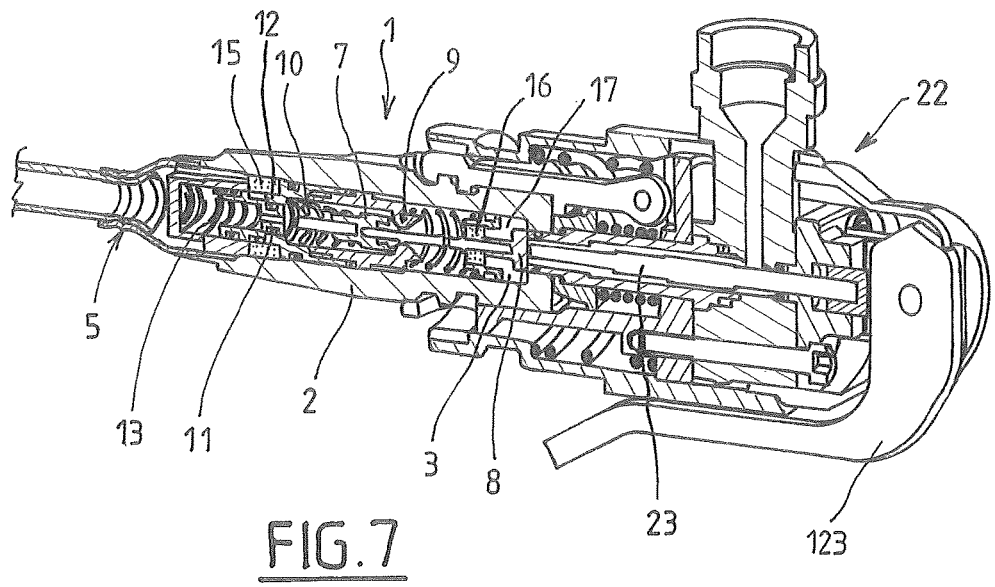
FIG. 7 depicts a view similar to FIG. 6 in which the valve fitting is connected to a gas conditioning tool and is in a first state (first valve open)

According to one advantageous feature, the dust valve 8 is able to be moved from its upstream position of closure toward a first determined downstream position referred to as the "contactless position" opening the upstream end of the circuit 3, in which position the downstream end 108 of the dust valve 8 does not push on the isolation valve 7 (no contact with the isolation valve 7) cf. FIGS. 2 and 7.

This position may be obtained for example by connecting to the upstream end of the body 2 of the valve fitting 1 a filling and/or extraction tool 22. For example, the tool 22 comprises a mobile valve pusher member 23 which moves the dust valve 8 slightly from upstream toward downstream (cf. FIGS. 2 and 7). The valve pusher 23 may be moved for example via a pivoting lever 123 that can be actuated manually, hydraulically, pneumatically, electrically or using any other suitable actuating member.

This contactless position offers numerous advantages. Thus, this configuration in which only the dust valve is 8 is open allows a filling and/or extraction tool to be coupled fluidtightly to the upstream end of the valve fitting with a force which remains constant whatever the level of pressure upstream of the isolation valve 7. Specifically, the pressure upstream of the dust valve 8 may be the same as outside the valve fitting (ambient atmospheric pressure), particularly when the dust valve 8 is closing the upstream end 6 of the circuit 3 in a non-fluidtight fashion.

In addition, this contactless configuration also allows a filling/extraction tool to perform leak tests on the isolation valve 7. The filling/extraction tool is coupled fluidtightly to the end 6 of the valve fitting and can be configured to evacuate (cause a reduced pressure in) the upstream part of the circuit 3 (upstream of the isolation valve 7). That allows one or more tests to be carried out in order to check/qualify the level of sealing of the valve 7 and of the tool, for example before the mechanism is subjected to high pressures.

Figure 8:
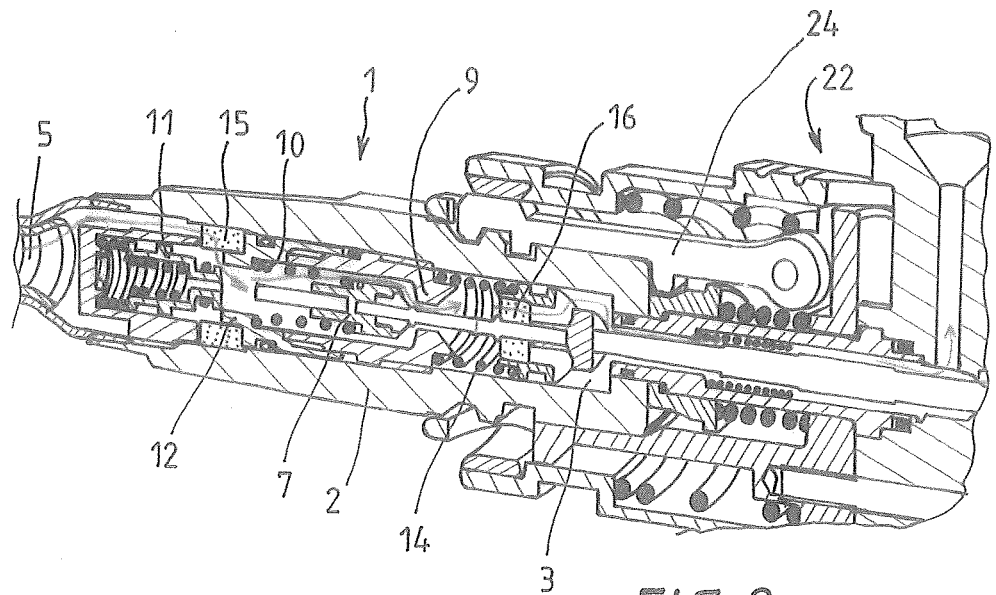
FIG. 8 depicts a schematic and partial view in longitudinal section of the valve fitting of FIG. 6 connected to a gas conditioning tool and in a second state referred to as the "extraction state"

The dust valve 8 can be moved further downstream into a second determined downstream position referred to as the "contacting position" opening the upstream end 6 of the circuit 3 and in which position the downstream end 108 of the dust valve 8 pushes on an upstream end of the isolation valve 7. The isolation valve 7 is therefore moved, through contact, off its seat 9 toward a first downstream position of opening of the circuit 3 in which position the isolation valve 7 does not push on the residual pressure valve 11 (cf. FIGS. 3, 8 and 9).

What that means to say is that, in this case, the first two valves 8, 7 are opened mechanically whereas the third, residual pressure, valve 11 opens or closes according to the pressure conditions (by fluidic actuation).

This configuration corresponds to a state of extraction of fluid through the valve fitting 1. Specifically, if the pressure differential between the inside of the reservoir 4 (downstream of the residual pressure valve 11) and the outside (upstream of the residual pressure valve 11) is high enough, the residual pressure valve 11 opens under the action of the pressure of the gas and the gas can escape from downstream 5 to upstream 6 as indicated schematically by the arrows in FIGS. 3, 8 and 9.

Figure 11:
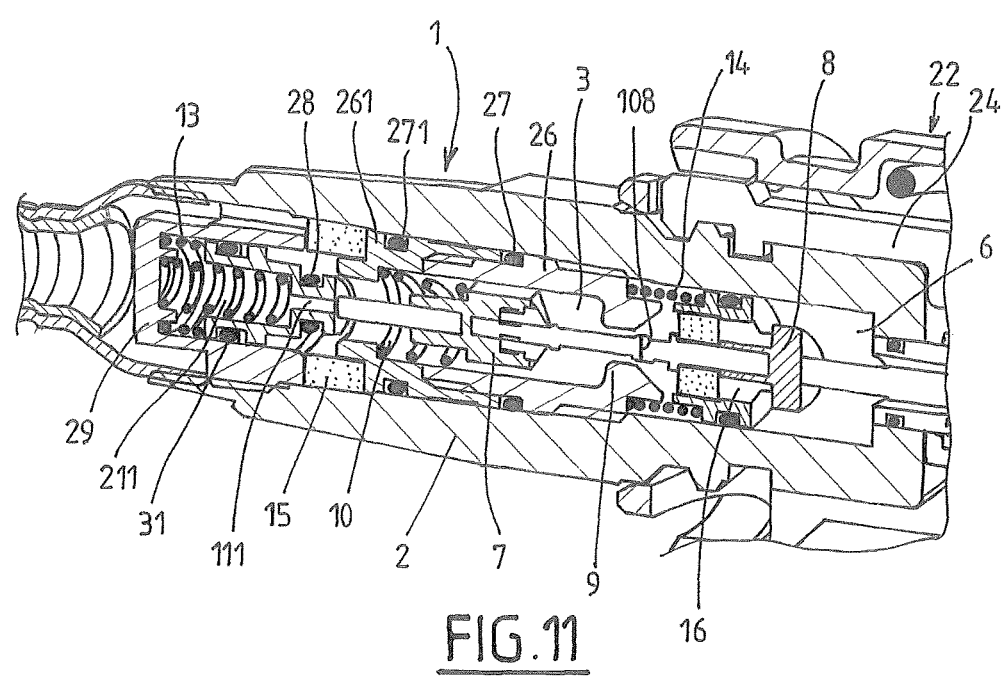
FIG. 11 depicts a view in longitudinal section of the valve fitting of FIG. 6 in which view the valve fitting is connected to a gas conditioning tool and is in a third state referred to as the "filling state"

The dust valve 8 can be moved still further in the downstream direction into a third determined downstream position referred to as the "filling position" opening the upstream end 6 of the circuit 3. In this position, the downstream end 108 of the dust valve 8 pushes on an upstream end of the mobile isolation valve 7 in order through contact to move the isolation valve 7 off its seat 9 toward a second downstream position of opening of the circuit 3. In this position, the isolation valve 7 pushes the residual pressure valve 11 into a position of opening of the downstream end of the circuit 3. What that means to say is that, in this case, the three valves 8, 7, 11 are opened mechanically (which means to say by sequenced mechanical actuation), cf. FIGS. 4 and 11.

In particular, the residual pressure valve 11 is thus opened mechanically whatever the fluid pressure differential to which it is subjected.

This configuration corresponds to a state of filling of a reservoir 4 through the valve fitting 1, FIG. 4 using arrows to schematically illustrate the path of the gas from upstream 6 to downstream 5.

Thus, the isolation valve 7 can be moved from its upstream position of closure in the downstream direction into:
  a first determined downstream position of opening of the circuit 3, in which position the isolation valve 7 does not push on the residual pressure valve 11, or
  a second determined downstream position of opening of the circuit 3, in which position a downstream end of the isolation valve 7 pushes on an upstream end of the residual pressure valve 11 moving the residual pressure valve 11 into a position of forced opening of the downstream end of the circuit 3.

For preference, the residual pressure valve 11 comprises a nonreturn (NRV) mechanism 111, 211 generating a force on the residual pressure valve 11 urging it toward its position of closure of the circuit 3 when this valve is not mechanically actuated and is subjected to a determined fluidic pressure on its upstream part.

What this means to say is that, in the configuration of FIG. 3, if a user attempts to fill the reservoir (by injecting pressurized gas from upstream 6 to downstream), the nonreturn mechanism will cause the residual pressure valve 11 to close as illustrated in FIG. 5. In particular, the pressure of the gas from upstream 6 to downstream 5 will generate on the residual pressure valve 11 an effect in the direction of closure of this valve (which is symbolized by an arrow pointing upward on the downstream end of the residual pressure valve 11).

Figure 12:
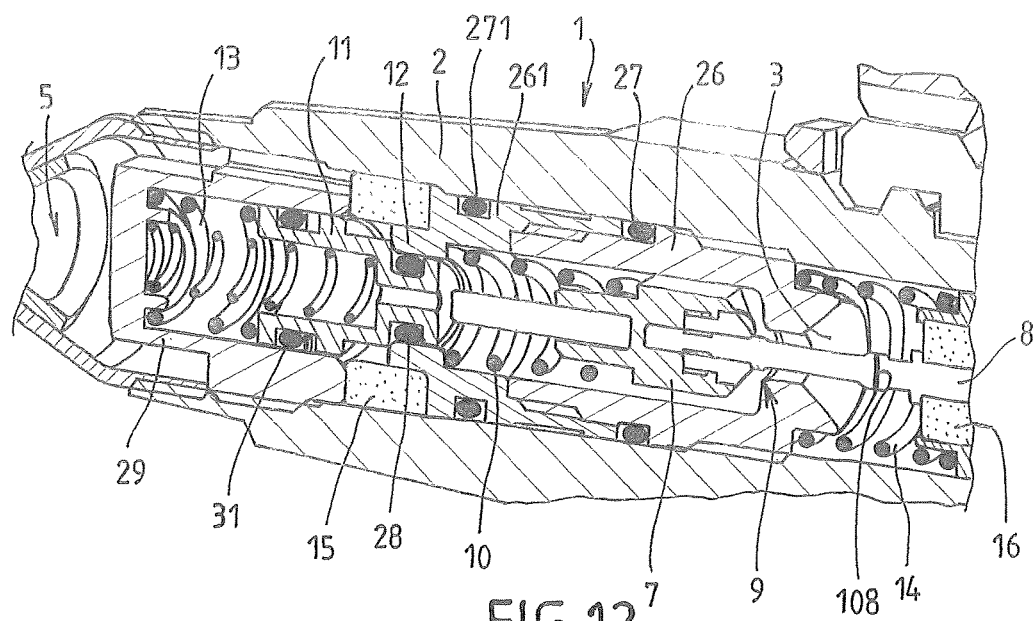
FIG. 12 depicts a view in longitudinal section of the valve fitting of FIG. 6 in which view the valve fitting is connected to a gas conditioning tool and is in a fourth state referred to as the "nonreturn state".

As illustrated in FIG. 6 et seq. and in particular in FIG. 12, the nonreturn (NRV) mechanism 111, 211 may comprise a canal 111 connecting an upstream end of the residual pressure valve 11 to a fluidtight downstream chamber 211 so as to convert a fluidic pressure on the upstream part of the residual pressure valve 11 into a force on the downstream end of the residual pressure valve 11 that tends to move said residual pressure valve 11 into its position of closure of the circuit 3. The nonreturn (NRV) mechanism 111, 211 may in particular comprise a determined ratio of surface areas between, on the one hand, the upstream end of the residual pressure valve 11 that is subjected to a fluid coming from upstream in the circuit 3 (coming from outside) and, on the other hand, the downstream end of the residual pressure valve 11. This urges the residual pressure valve 11 into the position of closure when its upstream end is subjected to pressurized fluid having a pressure higher than the pressure exerted on its downstream end.

This architecture, with nonreturn (NRV) mechanism 111, 211, makes it possible to perform cycles of rinsing the circuit 3 as far as upstream of the residual pressure valve 11 so as for example to create mixtures in the cylinder. What this means to say is that the pressure in the circuit 3 is successively raised and then reduced (for purge). Because the dust valve 8 is open, when it is subjected to pressure, the isolation valve 7 is opened (pneumatically or mechanically) and the residual pressure valve 11 with the NRV mechanism remains closed (because it is not actuated mechanically). Because the dust valve 8 is open, during the purge (pressure reduction) phases, if the isolation valve 7 is opened mechanically, the residual pressure valve 11 with the NRV mechanism remains closed and the circuit is purged as far as upstream of the residual pressure valve 11. If, during purge, the isolation valve 7 is closed (not actuated mechanically) the purge is performed only upstream of the isolation valve 7. These purge phases make it possible to remove and check the nature of the gas in the relevant parts of the circuit without contaminating the volume downstream of the circuit which is in communication with the cylinder 5. The pressure ranges used during pressurizing phases may be comprised for example between 10 and 100 bar, whereas the purge pressure ranges may be comprised for example between 3 bar above atmospheric pressure and 1 bar below atmospheric pressure.

In the nonlimiting example described, when pressurized gas comes from upstream, this gas enters the fluidtight downstream chamber 211 via the canal 111 and as a result of the resultant of the forces pushes the valve 11 toward its seat (in the upstream direction) cf. FIGS. 5 and 12.

For example, the residual pressure valve 11 is configured to reclose the circuit 3 as long as the pressure differential between its downstream and upstream ends does not exceed a determined amount, for example comprised between 3 and 6 bar, which means to say that, unless it is mechanically actuated toward its position of opening, the residual pressure valve 11 opens the circuit only when the fluid pressure exerted on its downstream face exceeds the pressure exerted on its upstream face by a determined amount. In addition, the higher the pressure from upstream, the greater the valve closure force for the valve 11.

FIGS. 6 to 12 illustrate in greater detail one possible and nonlimiting exemplary embodiment of a valve fitting according to FIGS. 1 to 5.

The valve fitting 1 has a body 2 of essentially or predominantly cylindrical shape and comprising four successive distinct zones.

Thus, a first zone of the body 2 (on the upstream side 6) comprises a cylindrical portion 18 defining on the exterior surface of the body 2 one or more grooves 19 and/or one or more ribs 20. This portion 18 is designed to form a determined set of impressions in order to collaborate in mechanical engagement with a determined mating attachment member 24 (claw(s) and/or system involving balls or the like) of a conditioning member 22 (cf. for example FIG. 7). This portion 18 thus allows error proofing or decoding between the gas valve fitting 2 (and therefore the gas in the reservoir to which it is connected) and the corresponding extraction or filling module 22.

Downstream of this portion 18, the body 2 preferably comprises a zone designed to collaborate with a tool (for example a wrench) for mounting on a reservoir. This interface preferably has multiple facets and is, for example, hexagonal so as to collaborate with a tightening tool and capable of withstanding the tightening torque needed for correct retention of the body on a reservoir.

Downstream, the body 2 comprises a threaded zone 22 for coupling the valve fitting 1 into the tapping of a gas cylinder for example.

The body 2 comprises an internal central longitudinal bore forming the internal circuit 3. The dust valve 8 situated at the upstream end 6 of the circuit 3 is preferably a valve that does not seal fluidtightly. What that means to say is that, in its closure position, it closes the upstream end in a non-fluidtight fashion. For preference also, the dust valve 8 lies flush (is situated in the same plane as the upstream end 6 of the body 2) in the closure position. In this way, the risk of accumulating water, dust or dirt is avoided or at least reduced thanks to the dust valve 8.

As illustrated, the dust valve 8 may bear a filter 16 interposed in the path of at least some of the fluid passing between upstream and downstream in the circuit 3. The filter 16, which protects the valves 7, 11 downstream is preferably able to move with the dust valve 8.

As also illustrated, the dust valve 8 may comprise one or more internal passages 17 to guide at least part of the flow of fluid flowing from upstream 3 to downstream 4 through the body of said dust valve 8. The passage or passages 17 are preferably situated upstream of the filter 16 borne by the dust valve 8 and open upstream of said filter 16. In addition, in order to cause the flow of gas through the filter 16 to converge, the periphery of the dust valve 8 may comprise a seal (for example an O-ring seal) collaborating with the internal wall of the internal circuit 3 in order to force the stream of the gas to converge in the passages 17 and the filter 16.

The isolation valve 8 may comprise a central stem projecting in the downstream direction (forming a downstream end 108) and allowing collaboration with the adjacent isolation valve 7. For example, this central stem may close off a functional clearance (used for mounting the stem in the filter 16) using a conical shape that slightly deforms a central hole in the filter 16.

The filter 16 may be crimped into the dust valve 8 via a deformable external zone of the valve 8. This makes it possible to ensure that the filter 16 is held in place in the dust valve 8 and to close off the functional clearance (for mounting the filter 16 in the dust valve 8).

Downstream, the isolation valve 7 and its return member 10 may be formed in a tubular cartridge 26, 261 screwed into the body 2. This cartridge may be formed of two components 26, 261 screwed one into the other and respectively each incorporating an O-ring seal 27, 271 on its external periphery to provide the internal sealing. This cartridge 26, 261 guides the return member (spring 10) of the isolation valve 7.

As illustrated, the downstream end of this cartridge 261 may accommodate and guide an annular extraction filter 15 positioned downstream of the isolation valve 7.

This downstream end of the cartridge 261 may also collaborate with the residual pressure valve 11 by forming a seat for the latter.

In particular, the downstream end of this cartridge 261 forms a housing accommodating and compressing a seal 28 (for example an O-ring seal) of an upstream end of the residual pressure valve 11.

The residual pressure valve 11 may comprise a shutter able to move in a component 29 in the form of a cap.

The shutter of the residual pressure valve 11 may comprise another downstream peripheral seal 31 collaborating with the inside of the plug-shaped component 29. The diameters of the two seals 28, 31 of the residual pressure valve 11 are different so as to generate a difference in cross section on which the gas can act.

At least one spring 13 housed in the cap-shaped component 29 generates a closure force on the shutter 11 in the upstream direction in order to guarantee a minimum determined residual pressure upstream (for example three bar gauge) before allowing the residual pressure valve 11 to open under the action of the pressure downstream (in the reservoir).

The cap-shaped component 29 is for example screwed into the body 2 and with the shutter 11 delimits the downstream chamber 211 of the nonreturn mechanism.

The cap-shaped component 29 for example clamps (compresses) the extraction filter 15 against the downstream end of the cartridge 261.

Figure 10:
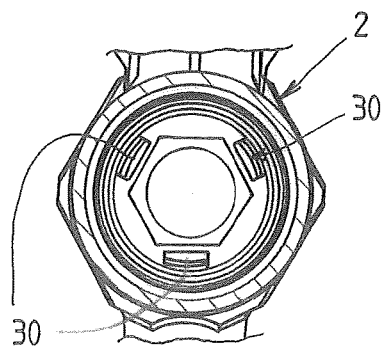
FIG. 10 depicts a view in cross section of the valve fitting of FIG. 9 in section on the line AA.
Figure 9:
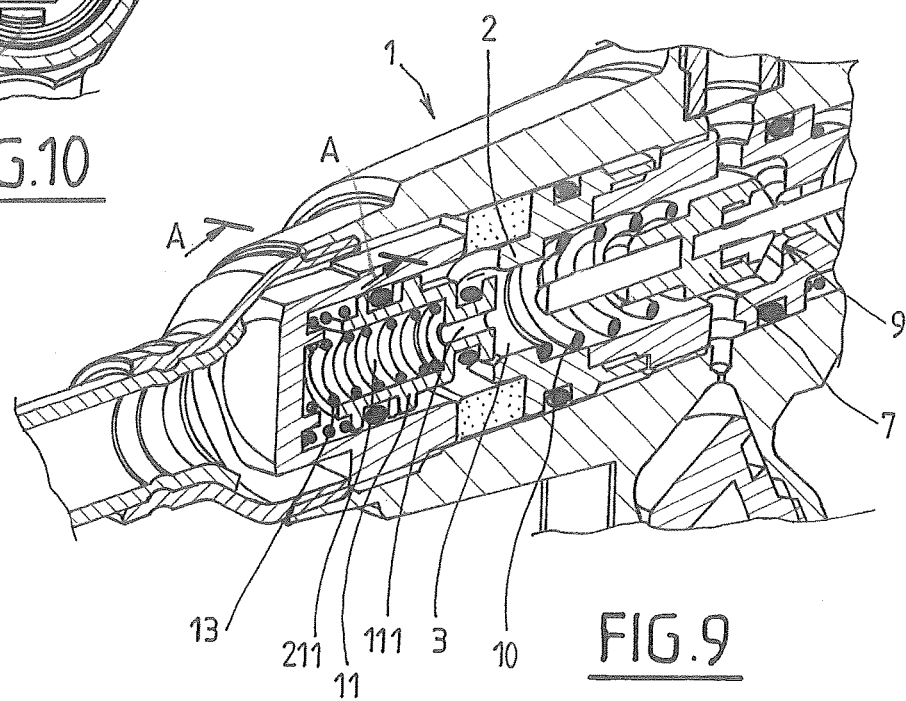
FIG. 9 depicts a schematic and partial view in longitudinal section of the valve fitting of FIG. 6 connected to a gas conditioning tool and in a second state referred to as the "extraction state"

As visible in FIGS. 9 and 10, this plug-shaped component 29 may comprise or delimit longitudinal peripheral grooves 30 at its external periphery to channel the passage of the gas between upstream and downstream. What this means to say is that the passage of gas between upstream and downstream of the isolation valve 11 is guided by these grooves 30 and forces the gas to have to pass through the extraction filter 15. It should be noted that the extraction filter may be fixed (cf. FIGS. 6 to 11) or mobile (cf. FIGS. 4 and 5).

A descending tube 31 may be crimped to the downstream end of the body 2. This tube 31 may act as a locknut for the cap-forming component 29 of the residual pressure valve 11.

In the closure position of the isolation valve 7 (FIGS. 1, 6; 2, 7) the pressure downstream in the reservoir 4 opens the residual pressure valve 11 (by overcoming the spring rate thereof). The cartridge 26, 261 may have a though-passage (not depicted in the Figures) forming a passage for the pressurized gas which is situated upstream of the seat 9 of the isolation valve 7 leading toward the peripheral space situated between the two peripheral seals 27, 271 of the cartridge 26, 261. This pressurized space may be connected to at least one of the following:
- a pressure measurement member (for example a pressure gauge mounted on the body 2) to indicate the pressure in the reservoir 4,
- a pressure-sensitive safety valve to discharge gas to the outside in the event of excessive pressure.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A valve fitting comprising:
    a body delimiting an internal circuit for filling and extracting fluid, said internal circuit extending between an upstream end configure to be connected to a user member extracting or distributing pressurized fluid via the internal circuit and a downstream end configured to be placed in communication with the storage volume of a pressurized-fluid reservoir,
    the valve fitting comprising, arranged in series in the internal circuit: an isolation valve and a dust valve, the isolation valve configured to move relative to a seat between an upstream position of closure of the circuit (3) and at least one downstream position of opening of the circuit,
    the isolation valve being urged toward its upstream position by a return member,
    the dust valve comprising a downstream end and being arranged upstream of the isolation valve and able to move relative to the body between an upstream position of closure of the upstream end of the circuit and at least one downstream position of opening of the upstream end of the circuit,
    the dust valve being urged toward the upstream position by a return member, the valve fitting (further comprising, in the internal circuit a residual pressure valve distinct from the isolation valve, the residual pressure valve being arranged in series with the isolation valve and downstream of the isolation valve, and wherein the dust valve can be moved from its upstream position of closure toward:
        a first predetermined downstream position, referred to as the "contactless position", opening the upstream end of the circuit, wherein the downstream end of the dust valve does not push on the isolation valve, or
        a second predetermined downstream position, referred to as the "contacting position", opening the upstream end of the circuit, wherein the downstream end of the dust valve pushes on an upstream end of the mobile isolation valve in order, through contact, to move the isolation valve off the seat toward a first downstream position of opening of the circuit wherein the isolation valve does not push on the residual pressure valve, or
        a third predetermined downstream position, referred to as the "filling position", opening the upstream end of the circuit, wherein the downstream end of the dust valve pushes on an upstream end of the mobile isolation valve in order through contact to move the isolation valve off the seat toward a second downstream position of opening of the circuit in wherein the isolation valve pushes the residual pressure valve into a position of opening of the downstream end of the circuit.

2. The valve fitting of claim 1, wherein the residual pressure valve comprises a nonreturn mechanism generating a force on the residual pressure valve that urges the residual pressure valve toward the position of closure of the circuit when the residual pressure valve is not mechanically actuated and is subjected to a determined fluidic pressure on its upstream part.

3. The valve of claim 2, wherein the nonreturn mechanism comprises a canal connecting an upstream end of the residual pressure valve to a downstream chamber to convert a fluidic pressure on the upstream part of the residual pressure valve into a force on the downstream end of the residual pressure valve thereby moving said residual pressure valve into the position of closure of the circuit.

4. The valve fitting of claim 3, wherein the nonreturn mechanism comprises a predetermined ratio of surface areas between, the upstream end of the residual pressure valve that is subjected to a fluid coming from upstream in the circuit and the downstream end of the residual pressure valve, so as to urge said residual pressure valve into the position of closure when these downstream and upstream ends are subjected to a determined pressure differential.

5. The valve fitting of claim 1, wherein when the residual pressure valve is not moved mechanically into a position of opening of the circuit, the nonreturn mechanism prevents pressurized fluid from passing from upstream to downstream by keeping the residual pressure valve closed via the pressure of the fluid flowing from upstream to downstream on the residual pressure valve.

6. The valve fitting of claim 1, wherein the dust valve bears a filter interposed in the path of at least some of the fluid passing between the upstream and downstream ends of the circuit, the filter being able to move with the dust valve.

7. The valve fitting of claim 1, further comprising a downstream filter arranged in the internal circuit and interposed downstream of the residual pressure valve and forcing at least a portion of the flow of fluid passing through the circuit through the open residual pressure valve to pass through the filter.

8. The valve fitting of claim 1, wherein the residual pressure valve is configured to re-close the circuit as long as the pressure differential between the downstream and upstream ends does not exceed a predetermined value comprised between 3 and 6 bar.

9. A pressurized-fluid receptacle, comprising a valve fitting as claimed in claim 1.

10. A method of filling a pressurized-fluid receptacle comprising a valve fitting as claimed in claim 1, by means of a conditioning outlet removably connected mechanically to the body of the valve fitting, comprising a step of moving the dust valve from upstream to downstream into a determined downstream position, referred to as the "filling position", opening the upstream end of the circuit, in which position the downstream end of the dust valve pushes on an upstream end of the mobile isolation valve and through contact moves the isolation valve off the seat into a downstream position of opening of the circuit and wherein the residual pressure valve is also moved into a position of opening of the downstream end of the circuit so as to allow fluid to be transferred from upstream to downstream into the receptacle.

11. The filling method of claim 10, wherein in the determined downstream position, referred to as the "filling position", the downstream end of the dust valve pushes on an upstream end of the mobile isolation valve and thereby moves the isolation valve into a predetermined open position in which position the isolation valve in turn pushes the residual pressure valve into an open position of the downstream end of the circuit so as to allow the transfer of fluid from upstream to downstream into the receptacle.

12. The method of claim 10, wherein the dust valve is moved downstream by a mechanical action of one end of a mobile valve pusher belonging to the conditioning outlet.

13. A method of extracting pressurized fluid from a pressurized-fluid receptacle as claimed in claim 9, by means of a conditioning outlet removably mechanically connected to the body of the valve fitting, comprising a first step of moving the dust valve from upstream to downstream into a predetermined downstream position ,referred to as the "contacting position", opening the upstream end of the circuit, in which position the downstream end of the dust valve pushes on an upstream end of the mobile isolation valve in order through contact to move the isolation valve off the seat toward a first downstream position of opening of the circuit in which position the isolation valve does not push on the residual pressure valve, so as to allow fluid to be extracted from the circuit from downstream to upstream through the residual pressure valve which has been opened by the downstream pressure in the receptacle.

14. A method of evacuating the valve fitting of a pressurized-fluid receptacle as claimed in claim 9, by means of a conditioning outlet connected mechanically and fluidtightly to the body of the valve fitting, comprising a step of moving the dust valve from upstream to downstream into a determined downstream position ,referred to as the "contactless position", opening the upstream end of the circuit but in which the downstream end of the dust valve does not push on an upstream end of the mobile isolation valve which remains in the closure position, and a step of generating a subatmospheric pressure in the upstream part of the extraction circuit.

* * * * *